(12) United States Patent
Petzel et al.

(10) Patent No.: US 8,474,908 B2
(45) Date of Patent: Jul. 2, 2013

(54) SEAT ELEMENT AND SEATING SYSTEM

(75) Inventors: Jan Petzel, Tuebingen (DE); Thomas Preiss, Mehlingen (DE); Veit Stoessel, Nürnberg (DE); David A. Swan, Aurora (CA); Renato Colja, Windsor (CA)

(73) Assignee: Schukra Geraetebau GmbH, Berndorf (AU)

( * ) Notice: Subject to any disclaimer, the term of this patent is extended or adjusted under 35 U.S.C. 154(b) by 1087 days.

(21) Appl. No.: 11/722,297

(22) PCT Filed: Dec. 23, 2005

(86) PCT No.: PCT/EP2005/014015
§ 371 (c)(1),
(2), (4) Date: May 6, 2010

(87) PCT Pub. No.: WO2006/069764
PCT Pub. Date: Jul. 6, 2006

(65) Prior Publication Data
US 2010/0207431 A1 Aug. 19, 2010

(30) Foreign Application Priority Data
Dec. 23, 2004 (DE) .......................... 10 2004 062 219

(51) Int. Cl.
*A47C 7/02* (2006.01)
*A47C 27/00* (2006.01)
(52) U.S. Cl.
USPC ................. 297/284.3; 297/284.4; 297/284.5; 297/230.1

(58) Field of Classification Search
USPC ........ 297/284.3–284.6, 284.9, 230.1, 230.11, 297/230.14
See application file for complete search history.

(56) References Cited

U.S. PATENT DOCUMENTS

| | | | | |
|---|---|---|---|---|
| 3,600,727 A | * | 8/1971 | Williams | 5/671 |
| 3,987,507 A | * | 10/1976 | Hall | 5/653 |
| 4,518,200 A | * | 5/1985 | Armstrong | 297/284.6 |
| 4,555,140 A | * | 11/1985 | Nemoto | 297/452.54 |
| 4,746,168 A | | 5/1988 | Bracesco | |
| 5,029,939 A | * | 7/1991 | Smith et al. | 297/284.1 |
| 5,076,643 A | * | 12/1991 | Colasanti et al. | 297/284.6 |
| 5,137,329 A | | 8/1992 | Neale | |

(Continued)

FOREIGN PATENT DOCUMENTS

| | | |
|---|---|---|
| DE | 8620922 | 10/1986 |
| DE | 10046743 A1 | 4/2002 |

(Continued)

OTHER PUBLICATIONS

PCT International Search Report for PCT/EP2005/014015.

(Continued)

*Primary Examiner* — David Dunn
*Assistant Examiner* — Timothy J Brindley
(74) *Attorney, Agent, or Firm* — Michael Best & Friedrich LLP

(57) ABSTRACT

Disclosed is a seat element (1) for a seat system, which extends substantially across an entire zone of a backrest and/or a seat area of a seat in a mounted state. Said seat element (1) comprises devices (12-21) for receiving functional elements in order to provide additional seat functions. Such a modular seat system makes it possible to create in a simple manner different fittings of a seat, especially a vehicle seat.

17 Claims, 3 Drawing Sheets

U.S. PATENT DOCUMENTS

| | | | |
|---|---|---|---|
| 5,558,398 A * | 9/1996 | Santos | 297/284.3 |
| 5,562,324 A | 10/1996 | Massara et al. | |
| 5,772,281 A * | 6/1998 | Massara | 297/284.4 |
| 5,816,654 A * | 10/1998 | Ellis | 297/284.5 |
| 5,826,937 A | 10/1998 | Massara | |
| 5,868,466 A | 2/1999 | Massara et al. | |
| 5,884,968 A | 3/1999 | Massara | |
| 5,893,184 A * | 4/1999 | Murphy | 297/452.41 |
| 5,902,011 A * | 5/1999 | Hand et al. | 297/284.6 |
| 5,967,608 A * | 10/1999 | Van Sickle | 297/284.6 |
| 6,129,419 A * | 10/2000 | Neale | 297/284.4 |
| 6,212,719 B1 * | 4/2001 | Thomas et al. | 5/713 |
| 6,273,810 B1 | 8/2001 | Rhodes et al. | 454/120 |
| 6,290,295 B1 | 9/2001 | Benden et al. | |
| 6,334,650 B1 * | 1/2002 | Chien-Chuan | 297/284.1 |
| 6,554,365 B2 * | 4/2003 | Karschin et al. | 297/440.14 |
| 6,758,522 B2 | 7/2004 | Ligon, Sr. et al. | |
| 6,823,549 B1 * | 11/2004 | Hampton et al. | 5/713 |
| 6,851,755 B2 * | 2/2005 | Dinkel et al. | 297/452.48 |
| 6,874,852 B2 | 4/2005 | Footitt | |
| 6,916,300 B2 | 7/2005 | Hester et al. | |
| 7,093,898 B2 * | 8/2006 | Ladron De Guevara | 297/284.6 |
| 7,255,394 B2 * | 8/2007 | Ogura | 297/284.4 |
| 7,559,607 B2 * | 7/2009 | Archambault et al. | 297/284.7 |
| 8,011,729 B2 | 9/2011 | Petzel et al. | |
| 2011/0285189 A1 | 11/2011 | Petzel et al. | |

FOREIGN PATENT DOCUMENTS

| | | |
|---|---|---|
| EP | 0485483 B1 | 5/1992 |
| EP | 1110809 A2 | 6/2001 |
| EP | 144070 A1 | 8/2004 |
| FR | 2816261 | 5/2002 |
| FR | 2823475 | 10/2002 |
| WO | WO98/54025 | 12/1998 |

OTHER PUBLICATIONS

Office Action from the United States Patent and Trademark Office for U.S. Appl. No. 13/204,298 dated Dec. 9, 2011 (5 pages).

* cited by examiner

SEAT ELEMENT AND SEATING SYSTEM

The present invention relates to a seating element and a seating system which includes the seating element. It relates particularly to a seating element and a seating system for vehicle seats, particularly in a motor vehicle.

Vehicle seats in modern motor vehicles may contain a large number of different luxury facilities. Known examples of these are seat-heating systems, arching mechanisms for adjusting the curvature or convexity of a seat backrest, particularly in the region of spinal curvature, such as are known from EP 0 485 483 B1 for example, or massaging facilities.

Motor vehicles of one type can generally be obtained with different levels of equipment. In the vehicles, the abovementioned luxury elements, in particular, may be present in seats in various designs or may even be omitted. For this purpose, different wiring systems, suspension systems and the like are needed in the particular seat, depending upon the level of equipment. It is therefore relatively expensive to make available the corresponding vehicle seat for each level of equipment. In addition, the subsequent addition of luxury elements is difficult, since the existing seat may possibly not offer the prerequisites needed for a particular luxury element.

It is therefore an object of the present invention to make available a seating element, and a corresponding seating system, in which individual functions, particularly luxury functions, can be added in a simple manner.

This object is achieved by means of a seating element according to claim 1. The dependent claims define advantageous or preferred exemplified embodiments of the seating element and also a seating system which includes the seating element.

According to the invention, a seating element for installation in a seat is made available, wherein the seating element is dimensioned in such a way that it extends, when in an installed condition, over substantially an entire region of a seat backrest and/or of a seating surface of the seat. According to the invention, the seating element has receptacles for receiving functional elements for making available additional seat functions. Through the fact that a seating element of this kind is made available which extends over an entire region of a seat backrest and/or of a seating surface and which has suitable receptacles for receiving functional elements, the functional elements can be added at desired points on the seat in a simple manner.

Under these circumstances, the seating element can, in particular, be substantially adapted to the contour of a seated human body. In this way, the seating element serves to distribute pressure. Because of the adapted shape, it is not necessary to provide thick upholstery on the seating element. Thinner layers are therefore also possible. On the one hand, this saves on material and, on the other, functional elements which are configured, for example, as massaging elements, can be felt better through a thinner layer.

The seating element may, for example, be produced in one piece by the injection moulding of a plastic. In the case of seating elements which extend both over the region of the seat backrest and also over the region of the seating surface, a hinging means, for example one or more film hinges, may be disposed between a seat-backrest section and a seating-surface section.

The receptacles for receiving functional elements may, for example, include receptacles for receiving arching elements, it being possible to set the convexity or curvature of the seating element at particular points, for example in a lumbar region, by means of the arching elements. For this purpose, in particular, the seating element may include flat elements, for example plates or else elements consisting of longitudinal and transverse struts, that can be arched at suitable points. The arching element is then disposed so as to be adjacent, particularly on a side that faces away from a user of the seat, to the said element that can be arched, and may arch or curve the latter. It is then possible for example, in a simpler level of equipment, to dispose a stationary element adjacent to the element that can be arched, in order to bring about a fixed curvature.

For this purpose, fixed guides, for example wires, for receiving the arching element may also be present in the seating element. The arching element may then be moved by means of these wires in order to give rise to convexity of the seating element at a desired point.

The receptacles may also include receptacles for receiving heating, cooling and ventilating elements. The seat can be cooled or heated up by the seating element by means of elements of this kind. For this purpose, the seating module preferably includes air ducts through which heated or cool air can flow. These air guides may, in particular, also include openings towards an outer side of the seat.

Since the air guides are already provided in the seating element, heating, cooling or ventilating elements of this kind can be retrofitted or interchanged in a simple manner. The air guides may include ribs which simultaneously serve to stiffen the seating element.

The receptacles may also include receptacles for massaging elements. Receptacles of this kind for massaging elements are preferably disposed, in particular, in a shoulder and back region.

A seating system according to the invention includes the seating element explained above and also a number of different functional elements which can be inserted in the seating element as required in order to equip a corresponding seat in the manner desired. With a seating system of this kind, seats with different levels of equipment can be made available in a simple manner, it being possible to always use the same seating element.

The invention will be explained in greater detail below with reference to the appended drawings and with the aid of preferred exemplified embodiments. In the drawings.

Figure 1:
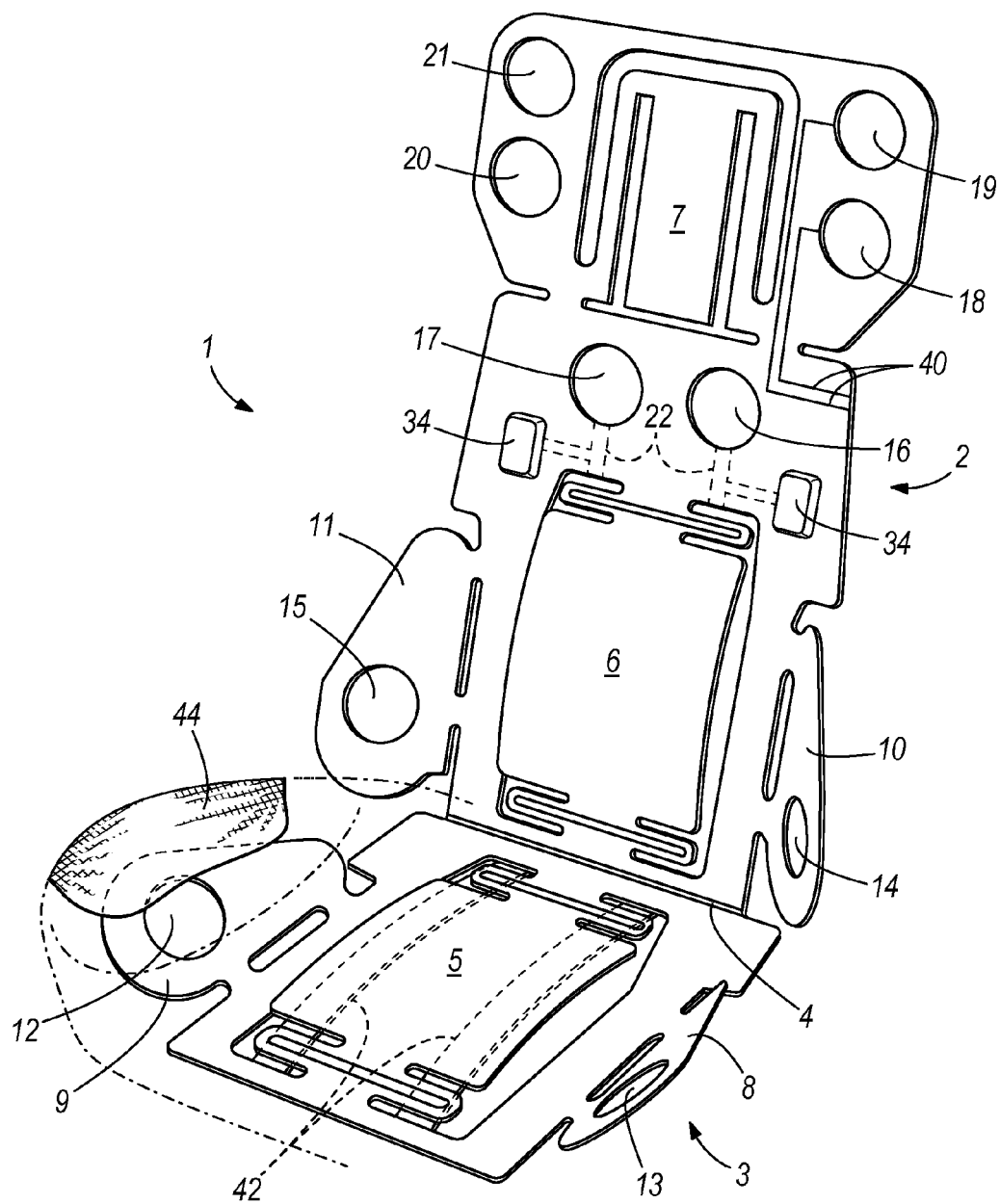
FIG. 1 shows a front view, in perspective, of a seating element according to the invention.

Represented in FIG. 1 is a front view, in perspective, of a seating element according to the invention, which serves as the basic module of a seating system according to the invention, which will be described in greater detail below. The seating element 1 includes a backrest section 2 and a seat section 3, which are connected by a hinge 4. The seating element 1 is preferably produced from a plastic, for example by injection moulding. In this case, the hinge 4 is preferably a film hinge or a succession of several film hinges, in order to be able to set an angle of inclination of the backrest section 2 relative to the seat section 3. However, it is equally possible to produce the backrest section 2 and the seat section 3 as separate parts. In this case, it is not necessary to connect the backrest section 2 and seat section 3 by a hinge; on the contrary, they may also be installed separately in corresponding sections of a seat. If the functionality of the seating element according to the invention is required only in the backrest or in the seating surface of a seat, it is naturally necessary to make available only the corresponding section.

The seating element 1 is intended for installation in a seat and is shaped in such a way that it offers support for a vehicle occupant who is sitting on the particular seat, that is to say, the seating element is ergonomically adapted to the shape of a seated body. For this purpose, in particular, a lumbar-arching plate 6 is provided in a lumbar region, a shoulder-arching plate 7 in a shoulder/neck region, and a seat-arching plate 5 in the seat section 3. In the various regions or sections of the seat, it is also possible to provide more than one arching plate in each case, for example two or more seat-arching plates, or else individual arching plates may be omitted. By means of these arching plates, the corresponding parts of the body can be supported in a suitable manner. As will be explained in greater detail below, the arching plates 5-7 may also be coupled to corresponding adjusting mechanisms so that the convexity is adjustable. Naturally it is possible to provide, both in the backrest section 2 and also in the seat section 3, more or fewer arching plates, as required, than are represented as examples in FIG. 1, for example an arching plate may also be provided in a chest region.

The seating element 1 also has side-pieces 10, 11 on the backrest section 2, and side-pieces 8, 9 on the seat section 3. These side-pieces impart lateral stability to an occupant sitting on the seat. In principle, side-pieces of this kind are known from so-called "sports seats", but may also be provided in other seats.

The seating element 1 also has a plurality of receptacles 12-21 in which various functional or luxury elements may be received. Functional elements of this kind may, for example, include massaging elements, fans, heating elements and the like. With the aid of heating elements and fans it is possible, for example, to heat up air and distribute it within the seat in order to thereby warm an occupant. On the other hand, it is also possible to either suck in cool air from the environment or to cool it by means of cooling elements in order to cool down the occupant. Finally, it is possible to massage a user by means of massaging elements in order to relax muscles which are inclined to suffer from cramp during car journeys. This is particularly the case in the region of the shoulders, so that massaging elements of this kind can be accommodated, for example, in receptacles 18 and 20. The functioning of the massaging elements can then, for example, be coupled to the abovementioned heat input, so that massaging takes place simultaneously with the said heat input. In this case, the heat input is preferably set or manually regulated in dependence upon the temperature in the vehicle and/or the outside temperature. The receptacles 12-21 may either be configured in a universal manner, so that various types of functional elements can be received, or else be designed for specific functional elements.

Other functional elements include, for example, elements which can be inserted in the receptacles 12-15 for the purpose of varying the thickness or position of the side-pieces 8-11. By means of elements of this kind, the side-pieces can be adapted to the particular occupant, it being possible to flatten out the side-pieces for the purpose of climbing in and out of the vehicle, in order to facilitate these actions. Elements of this kind for adjusting the side-pieces may be realised, for example, by means of inflatable gas bags.

In addition, it is possible to configure the connection between the side-pieces 8-11 and the seat section 3 or backrest section 2 after the fashion of a hinge, so that the side-pieces 8-11 can be adjusted by a folding movement.

Figure 2:
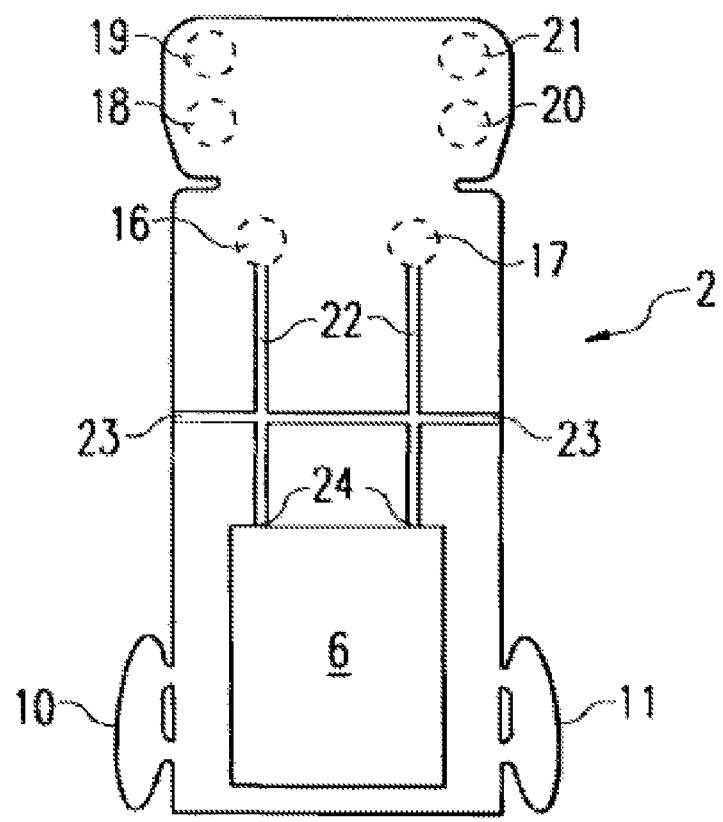
FIG. 2 shows a rear view of the seating element from FIG. 1.

As already described, fans, heating elements or cooling elements, inter alia, may be received in the receptacles 12-21, it being also possible to combine two or three of these functions in a single module, for example in the form of combined ventilating/heating elements. In order to conduct the air to the desired points within the seating element in the appropriate manner, air lines or air guides are preferably provided in the seating element 1. This is shown by way of an example in FIG. 2, which shows a rear view of the backrest section 2 from FIG. 1. In this case, it is assumed, by way of an example, that ventilating elements of this kind can be received in the receptacles 16 and 17. As FIG. 2 shows, air guides 22 are provided which extend in a manner emanating from the receptacles 16 and 17 and end in orifices 24 on the lumbar arching plate 16. By means of another air guide extending transversely to the air guides 22, air can also be directed to openings 23 which lie on the sides of the seating element 2. The air guides 22 may, for example, be designed as ducts or bores in the seating element 2. However, they are preferably formed by ribs which extend in a parallel manner and which simultaneously serve to stiffen the seating element 1 or the backrest section 2.

If ventilating units are now disposed in the receptacles 16 and 17, air can be directed to the lumbar arching plate 6 via the openings 24 in order to thus cool or—in the case of a corresponding heating element—warm up the occupant's lower back. In addition, warmed-up air can, in this case, be directed towards the outside via the openings 23 in order to also warm the occupant at the sides. This is particularly advantageous in the case of modern engines such as, for example, diesel engines, which are optimised with respect to fuel consumption to such an extent that they only warm up very slowly, the effect of which is that a conventional heating system belonging to the vehicle only supplies warm air after a fairly long time. Warm air can be generated very rapidly by a heating element disposed in the seating element 1 and can warm the occupant via the openings 23.

The disposition of the air guides which is shown in FIG. 2 is to be understood merely as an example. There is the further possibility of also providing substantially more air guides in the seat section 3, and the air guides may emanate from others of the receptacles 12-21 so that corresponding ventilating, heating or cooling elements can also be disposed in these other receptacles. In addition, air guides are also preferably provided for sucking in air, for example from locations underneath the seat, since it is generally relatively cool there.

At the same time, it is also possible to provide, on the seating element 1, passive pumping elements 34 which are activated by movements of an occupant on the seat in such a way that air for aerating the seat is pumped through the air guides 22. Thus aeration is possible, even without electrically operated fans.

Figure 3:
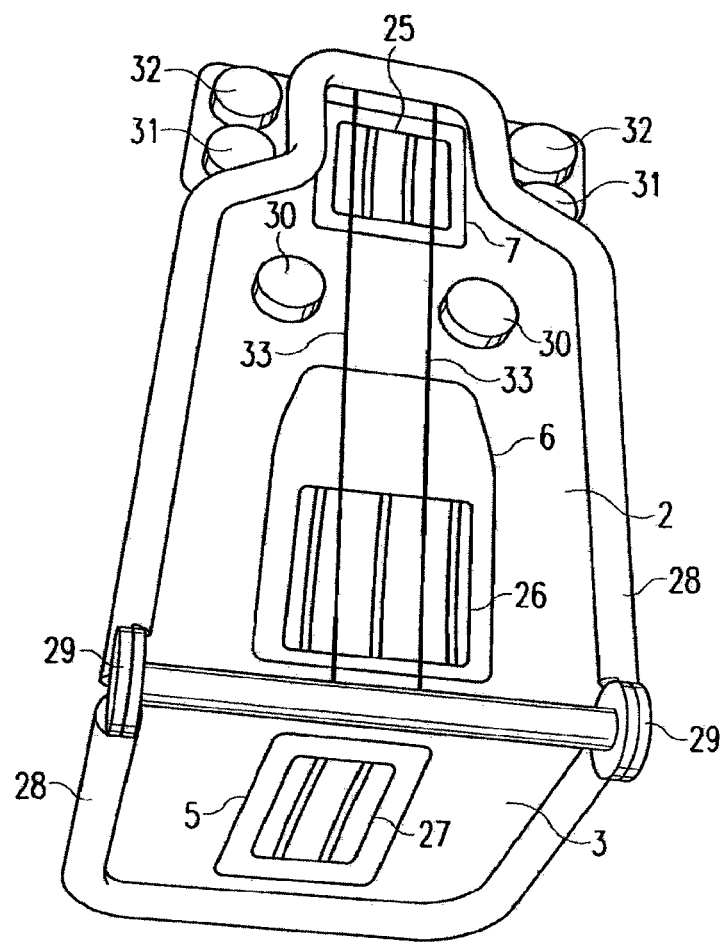
FIG. 3 shows a rear view, in perspective, of the seating element from FIG. 1 with additional functional elements.

FIG. 3 shows a rear view, in perspective, of the seating element 1 from FIG. 1, in a condition in which it is fastened to a seat frame 28. In addition, functional elements are installed in the receptacles 16-21 in FIG. 3; but for the sake of simplification, the side-pieces 8-11 and also the air guides from FIG. 2 are not represented.

Here, the seat frame 28 is formed by a backrest section and a seat section, which each include a tube which extends substantially along the contour of the seat. The backrest section and seat section of the seat frame 28 are connected by joints 29, in order to permit the setting of an angle of inclination of the seat backrest relative to the seating surface of the seat. In FIG. 3, the seating element 1 is fastened by fastening means (not represented) to the seat frame 28. For this purpose, use may be made of any type of known fastening means such as brackets, screws or clips. For this purpose, the seating element 1 may also be configured in such a way that it wholly or partially encompasses the seat frame 28.

As shown in FIG. 3, two wires 33, which are tensioned in the vertical direction in a substantially parallel manner, are attached to the backrest section 2 of the seating element 1. The wires 33 may be moulded directly into the backrest section 2 during the injection-moulding operation, or else fastened to the section—for example by clipping them in. The wires 33 once again serve as a guide and receptacle for arching elements 25, 26 which are capable of adjusting the convexity of the seat-arching plate 5 and the shoulder-arching plate 7. Alternatively, the arching elements may also be fastened to the seating element 1 in some other way, for example by screws, hooks or clips, as is shown in FIG. 3 using the example of an arching element 27 for the seat-arching plate 5. In this case, the arching elements 25, 26, 27 may operate, for example, in accordance with that in the patent initially mentioned, EP 0 485 483, in which two oppositely located ends of an overall pressure element are moved up to one another in order to set the convexity of the overall pressure element. In this case, the overall pressure element may be plate-shaped or constructed in the form of longitudinal and transverse struts. The convexity, which can be set, of the particular arching element can be transmitted by pressure or tension to the particular arching plate 5, 6, 7 in order to set the convexity of the latter. By using the wires 33 or, alternatively, other guide elements, it is possible, in particular, to adjust a vertical position of the arching element 26 along the wires 33, so that a vertical position of the convexity can also be set, in addition to the degree of convexity. The actuators needed for actuating the arching elements 25, 26, 27 may be integrated directly into the arching elements, under which circumstances, in the case of electric actuators, suitable wiring, similar to wiring 40 shown in FIG. 1 leading to receptacles 18, 19, may already be integrated into the seating element 1 so that it is not necessary, for example in the case of retrofitting arching elements to a seat, to carry out any wiring operation. Instead of electrical actuators, actuators are also conceivably possible in which the transmission of force takes place, for example, via a shaft—optionally likewise provided in the seating element 1—which transmits to the particular arching element an adjusting movement generated by an occupant, for example by actuating a rotary knob. Furthermore, it is also possible to provide pneumatic arching elements in which a differing degree of convexity is brought about, for example as a result of the inflation of a gas bag, e.g. an air pocket.

In addition, or as an alternative, to the wires 33, other wires of suitable thickness may also be disposed in the seating element 1, which wires impart a desired shape to the latter or stabilise its shape. Wires may also be used in some other way in order to guide the arching element 26.

One advantage of the preferred exemplified embodiment represented lies in the fact that the arching elements 25, 26, 27 are disposed on the rear side of the seat, that is to say on the side that faces away from a user of the seat, whereas in conventional seats with adjustable arching systems, corresponding adjusting elements are usually disposed between a rigid internal structure of the seat and upholstery on the side facing towards the user. In the exemplified embodiment represented, the pressure caused by the user on the surface of the seat is absorbed and uniformly distributed by the seating element 1. The arching elements 25, 26, 27, on the other hand, act on the fixedly installed arching plates from the averted side, a fact which likewise makes a uniform pressure-distribution possible.

In particular, the pressure is thus always distributed by the seating element 1, irrespective of the configuration of the arching element, so that the type and configuration of the arching elements can be varied without the behaviour of the seat changing substantially. For example, the mechanical arching elements represented can be replaced by the pneumatic arching elements already mentioned, in which, for example, gas bags or air pockets are filled with air in order to bring about convexity, without the behaviour of the seat changing substantially as far as the user is concerned. In conventional pneumatic systems, on the other hand, air pockets of this kind press directly on a foamed-out or upholstered portion of the seat and are thus able to exert only a locally limited pressure.

If pneumatic arching elements of this kind are provided, the said pneumatic arching elements, or even other pneumatic adjusting elements, may be attached directly to the seating element. The way in which this comes about may, in particular, be that the pneumatic adjusting elements use the face of the seating element 1 as one wall of the air pockets mentioned. Another possibility is the fixed attachment of an inherently airtight air pocket to said seating element.

In FIG. 3, ventilating/heating elements which warm up air, when required, and are able to distribute it for aeration purposes via the air guides which are not represented in FIG. 3 but are shown in FIG. 2, are received, by way of examples, in the receptacles 16 and 17 from FIG. 1. Provided in the shoulder region in the receptacles 18 and 20 are, for example, massaging elements 31 which are able to provide a massage in the shoulder region. In addition, there may be provided, in receptacles 19 and 21, heating elements 32 which, in this case, merely bring about warming-up without any circulation of the air. In this connection, the functional elements 30-32 are merely to be understood as examples, and other functional elements may also be employed, as required. The wiring, particularly for control and current-supply purposes, which is required for the functional elements 30-32, is preferably once again already provided in the seating element 1, so that simple conversion or retrofitting is possible.

In this connection, it should be mentioned that the arching elements 25, 26, 27 can also provide massaging functions, through the fact that the convexity is varied in time.

It is thus possible to realise modularly different levels of equipment in a simple manner with the aid of a seating system according to the invention with the seating element 1 serving as the basic module and the functional elements 25-27 and also 30-32 serving as add-on modules. In this connection, it is also possible for individual receptacles not to contain any functional elements, if these are not required for a particular level of equipment, and functional elements of different types and qualities (ones that can be actuated mechanically or electrically, ones with more or fewer possible settings, etc.) can be provided. It is also conceivably possible to insert fixed, that is to say rigid, elements in suitable receptacles instead of the arching elements 25-27, in order to fixedly predetermine the elasticity and shape of the arching plates 5-6. In this regard, it is also possible for bridges 42, which can be injection-moulded on, to be provided in the seating element 1 in order to obstruct movable parts such as the arching plates 5, 6, 7. In those versions of a corresponding seat in which adjustability of the particular movable part is to be provided, these bridges 42 are then removed, for example by breaking them out.

Receptacles for functional elements may also be provided at points other than those indicated. If pneumatic adjusting elements are provided, for example as arching elements or as setting elements for the side-pieces 8-11 from FIG. 1, suitable air guides for these may also be provided in the seating element 1.

The seating element 1 may be combined with conventional seat upholstery 44. In this case, the entire seating element 1 may also be directly enveloped by foam in order to form the upholstery 44, and then be attached, as a unit, to the seat frame 28. However, said upholstery 44 may also be attached directly or indirectly to the seating element 1 in some other way. However, since the seating element 1 is preferably configured in such a way that it is well adapted to the shape of a body and is thus able, itself, to provide for satisfactory pressure-distribution, it is also possible to provide only thin upholstery or some other layer, for example a suitable felt or a layer of foam. As a result of this, on the one hand material is saved and, on the other, the action of massaging elements is more effective.

It should be observed that individual elements of the seating element, for example arching plates or other structural elements, can also be produced separately from the rest of the seating element from other materials, such as wire mesh for example. Additional features of this kind may then, for example, also have movement-generating elements such as the arching elements mentioned. These separately produced elements then likewise form part of the seating element.

As already mentioned, the seating element 1 is preferably produced from a plastic by injection moulding. However, other materials or combinations of materials are also conceivably possible, e.g. a wire-mesh mat with wires which are contoured in a manner corresponding to the shape of the human body, and receiving facilities, which are mounted or are directly injection-moulded on at the same time, for the other components such as arching elements, fans or the like. Furthermore, the seating element may also contain other load-bearing structural parts of the seat as a whole, such as the seat frame for example, which are mounted on said seating element or fastened by enveloping injection moulding, or are integrated into said seating element in a combination of conventional mounting and enveloping injection moulding.

The invention claimed is:

1. A seating element for installation in a seat,
    wherein the seating element is dimensioned in such a way that it extends, when in a condition in which it is installed in the seat, substantially over an entire region of at least one seat portion chosen from the group consisting of a seat backrest and of a seating surface of the seat, and
    wherein the seating element comprises receptacles for receiving functional elements for making available additional seat functions,
    wherein the seating element comprises at least one archable section, there being disposed, adjacent to the at least one archable section, a receptacle for a functional element for setting the convexity of the at least one archable section,
    wherein the seating element includes side-pieces, the side pieces including one or more of the receptacles, and
    wherein said seating element comprises at least one removable element for obstructing the movement of the at least one archable section.
2. The seating element according to claim 1, wherein the seating element has a shape which is substantially adapted to the shape of a seated human being to provide an ergonomic pressure-distribution.
3. The seating element according to claim 1, wherein the seating element is made of plastic.
4. The seating element according to claim 1, wherein the seating element extends, when in an installed condition, over substantially an entire region of the seat backrest and of the seating surface of the seat, and wherein a backrest section of the seating element and a seating section of the seating element are connected by articulating means.
5. The seating element according to claim 4, wherein the articulating means include a film hinge.
6. The seating element according to claim 1, wherein the at least one archable section is disposed in at least one region chosen from the group consisting of a seating region, a lumbar region, a chest region and a shoulder/neck region of the seating element.
7. The seating element according to claim 1, wherein the receptacle for the functional element for setting the convexity of the at least one archable section comprises a guide for guiding the functional element for arching the at least one archable section.
8. The seating element according to claim 7, wherein the guide includes a wire for guiding the functional element.
9. The seating element according to claim 1, wherein the seating element includes at least one electrical line to be connected to functional elements receivable in the receptacles.
10. The seating element according to claim 1, wherein the seating element includes at least one air guide.
11. The seating element according to claim 10, wherein the at least one air guide connects at least one of the receptacles for functional elements for aeration purposes to at least one air opening.
12. The seating element according to claim 11, wherein the at least one air opening includes an air opening on one side of the seating element.
13. The seating element according to claim 10, wherein the seating element includes a passive pumping means which is coupled to the at least one air guide and which is configured such that it pumps air through the at least one air guide in dependence upon a movement of an occupant on the seat.
14. The seating element according to claim 1, wherein the seating element is provided with an upholstering layer.
15. A seating system for installation in a seat, comprising a seating element,
    wherein the seating element is dimensioned in such a way that it extends, when in a condition in which it is installed in the seat, substantially over an entire region of at least one seat portion chosen from the group consisting of a seat backrest and of a seating surface of the seat, and
    wherein the seating element comprises receptacles for receiving functional elements for making available additional seat functions,
    wherein the seating element includes at least one archable section, there being disposed, adjacent to the at least one archable section, a receptacle for a functional element for setting the convexity of the archable section, and
    a plurality of different functional elements, wherein functional elements of the plurality of different functional elements which are selected in dependence upon a predetermined level of equipment are receivable in receptacles in the seating element.
16. The seating system according to claim 15, wherein functional elements of the plurality of different functional elements comprise elements chosen from the group consisting of massaging elements, heating elements, ventilating elements, cooling elements, elements chosen from the group consisting of mechanical, electrical and pneumatic elements for adjusting the convexity of an archable section of the seating element, and elements for adjusting side-pieces of the seating element.
17. A seating element for installation in a seat, the seating element comprising:
    receptacles for receiving functional elements for making available additional seat functions; and
    at least one archable section, there being disposed, adjacent to the at least one archable section, a receptacle for a functional element for setting the convexity of the at least one archable section, wherein the receptacle for the functional element for setting the convexity of the at least one archable section comprises a guide for guiding the functional element for arching the at least one archable section, wherein the guide includes a wire for guiding the functional element, and wherein the seating element is dimensioned in such a way that it extends, when in a condition in which it is installed in the seat, substantially over an entire region of at least one seat portion chosen from the group consisting of a seat backrest and of a seating surface of the seat, and wherein said seating element comprises at least one removable element for obstructing the movement of the at least one archable section.

* * * * *

UNITED STATES PATENT AND TRADEMARK OFFICE
CERTIFICATE OF CORRECTION

PATENT NO. : 8,474,908 B2  
APPLICATION NO. : 11/722297  
DATED : July 2, 2013  
INVENTOR(S) : Petzel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1759 days.

Signed and Sealed this
Eighth Day of September, 2015

Michelle K. Lee
*Director of the United States Patent and Trademark Office*